United States Patent
Van Buren et al.

(10) Patent No.: US 9,422,954 B2
(45) Date of Patent: Aug. 23, 2016

(54) PIEZOELECTRIC DRIVEN OSCILLATING SURFACE

(71) Applicant: RENSSELAER POLYTECHNIC INSTITUTE, Troy, NY (US)

(72) Inventors: Tyler Van Buren, Springfield, PA (US); Michael Amitay, Loudonville, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 0 days.

(21) Appl. No.: 14/065,522

(22) Filed: Oct. 29, 2013

(65) Prior Publication Data

US 2014/0238522 A1    Aug. 28, 2014

Related U.S. Application Data

(60) Provisional application No. 61/733,460, filed on Dec. 5, 2012, provisional application No. 61/761,756, filed on Feb. 7, 2013.

(51) Int. Cl.
| | | |
|---|---|---|
| F15D 1/00 | (2006.01) | |
| B64C 21/10 | (2006.01) | |
| B64C 23/00 | (2006.01) | |

(52) U.S. Cl.
CPC .............. *F15D 1/007* (2013.01); *B64C 21/10* (2013.01); *B64C 23/005* (2013.01); *Y02T 50/166* (2013.01); *Y10T 29/42* (2015.01); *Y10T 137/2213* (2015.04)

(58) Field of Classification Search
CPC ....... B64C 23/005; B64C 21/10; F15D 1/007; Y02T 50/168
USPC ...................................................... 244/99.12
See application file for complete search history.

(56) References Cited

U.S. PATENT DOCUMENTS

| | | | |
|---|---|---|---|
| 4,825,227 A | | 4/1989 | Fischbeck et al. |
| 5,755,408 A | * | 5/1998 | Schmidt et al. ............... 244/204 |
| 6,332,593 B1 | | 12/2001 | Kamiadakis et al. |
| 6,412,732 B1 | * | 7/2002 | Amitay ................ B64C 23/005 |
| | | | 244/200 |
| 6,520,455 B2 | * | 2/2003 | Karniadakis et al. ......... 244/204 |
| 2004/0037718 A1 | | 2/2004 | Xie et al. |
| 2005/0030342 A1 | | 2/2005 | Silverbrook |
| 2009/0214358 A1 | | 8/2009 | O'Neill |
| 2010/0018322 A1 | * | 1/2010 | Neitzke et al. ............. 73/861.22 |
| 2010/0045752 A1 | | 2/2010 | Xu et al. |

FOREIGN PATENT DOCUMENTS

| | | |
|---|---|---|
| FR | 2 896 757 A3 | 8/2007 |
| FR | 2 915 169 A1 | 10/2008 |
| GB | 2 347 903 A | 9/2000 |
| JP | 2004-508952 A | 3/2004 |

OTHER PUBLICATIONS

International Search Report and Written Opinion issued in PCT/US2013/072958 mailed Aug. 26, 2014.
Supplementary European Search Report issued in EP 13 87 4663 dated Jun. 10, 2016.

* cited by examiner

*Primary Examiner* — Brian M O'Hara
(74) *Attorney, Agent, or Firm* — RatnerPrestia

(57) ABSTRACT

Disclosed herein is an active roughness actuator and a method of forming an active roughness actuator. The active roughness actuator includes a surface having at least one aperture; a compliant layer disposed on the surface such that the compliant layer covers the at least one aperture; a chamber having a fluid therein and a piezoelectric surface mechanically coupled to the chamber. The chamber is in fluid communication with the compliant layer via the at least one aperture. The piezoelectric surface is configured to displace the fluid in the chamber to control production of at least one dimple in the compliant layer proximate to the at least one aperture.

15 Claims, 10 Drawing Sheets

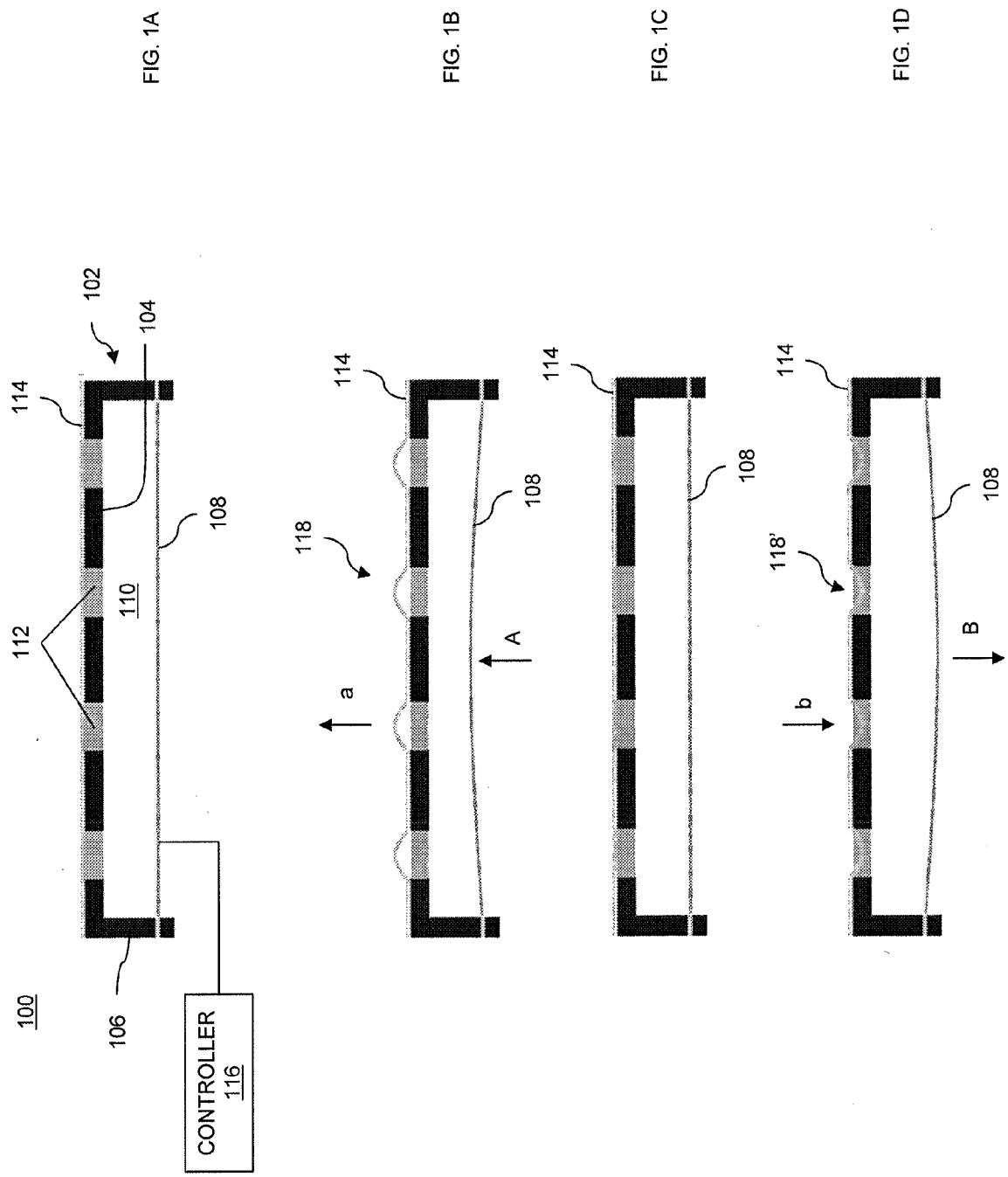

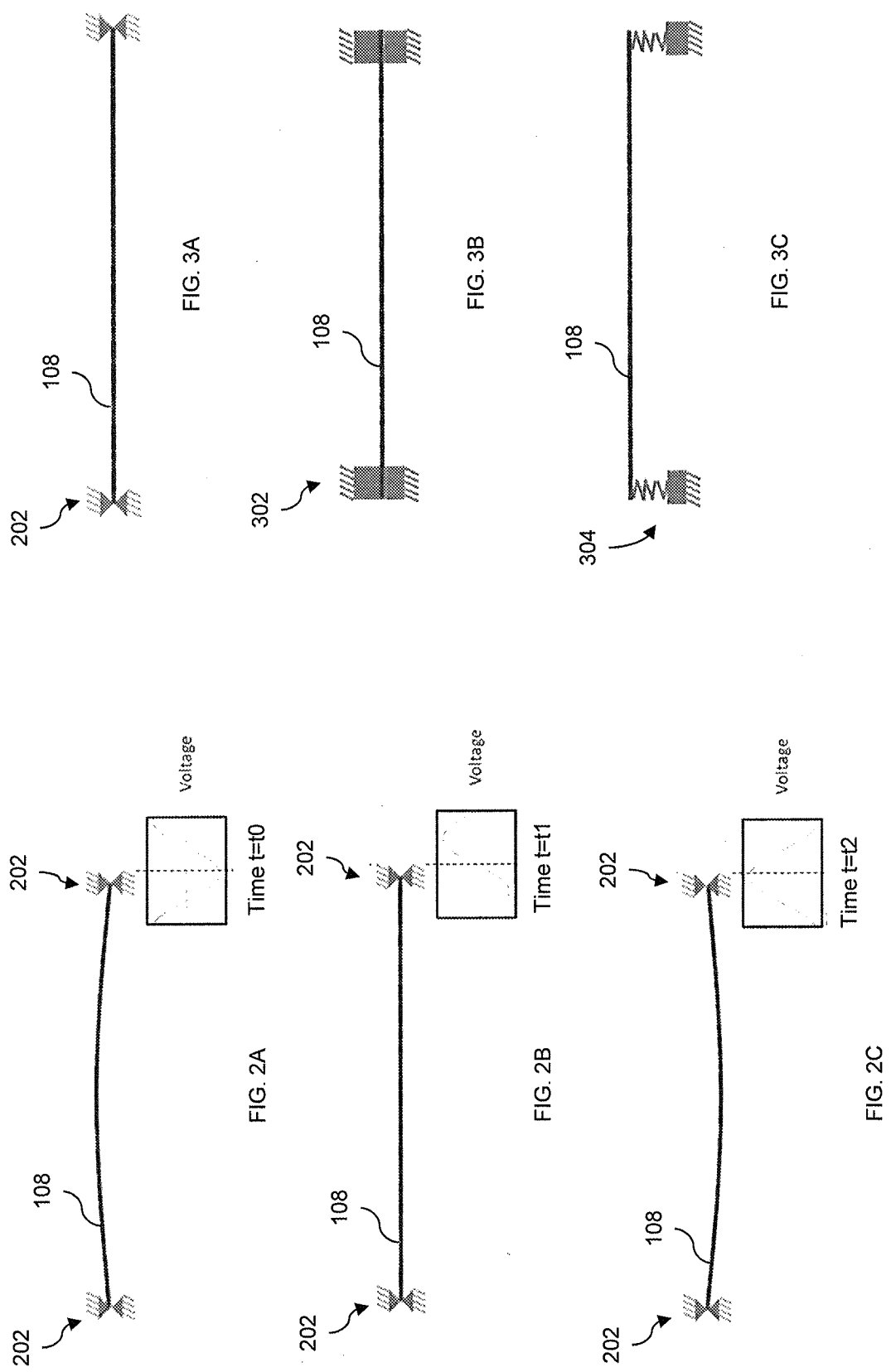

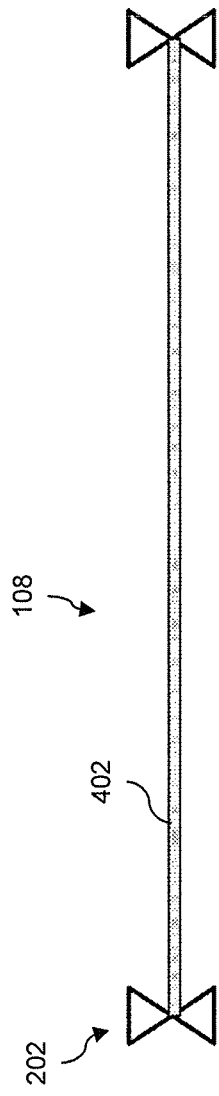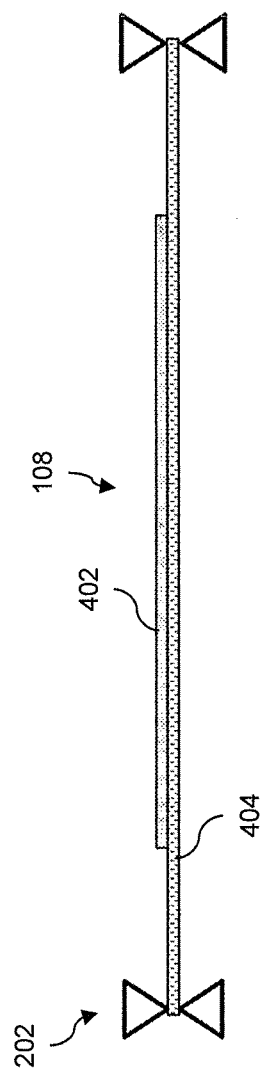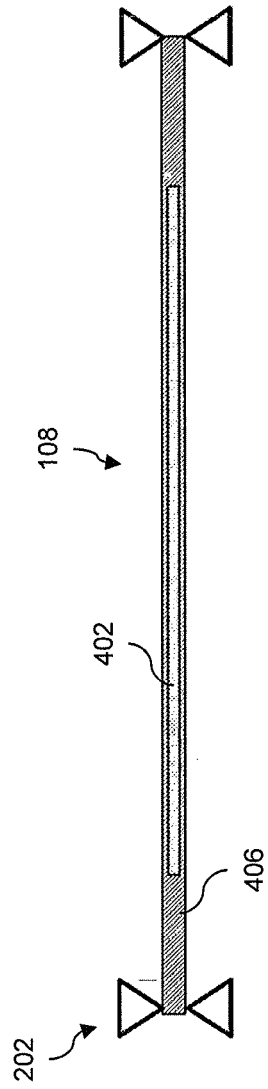

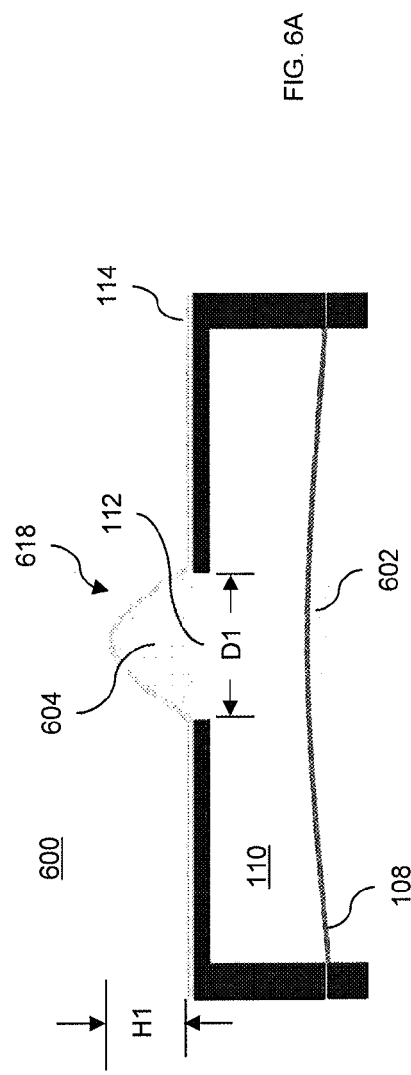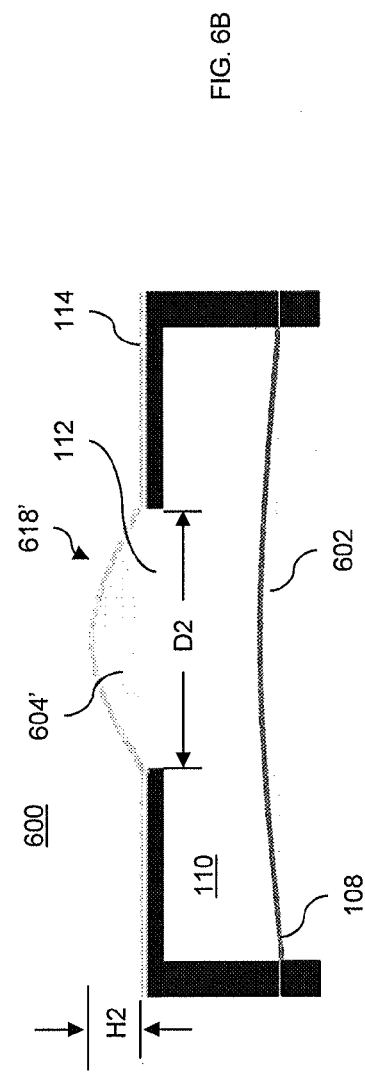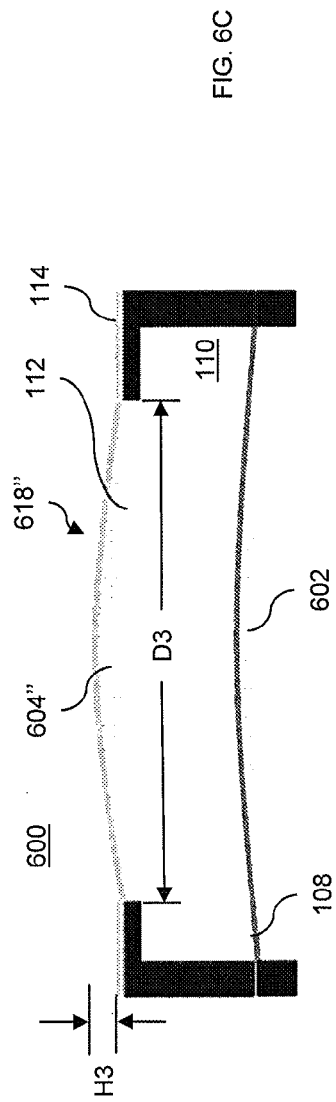

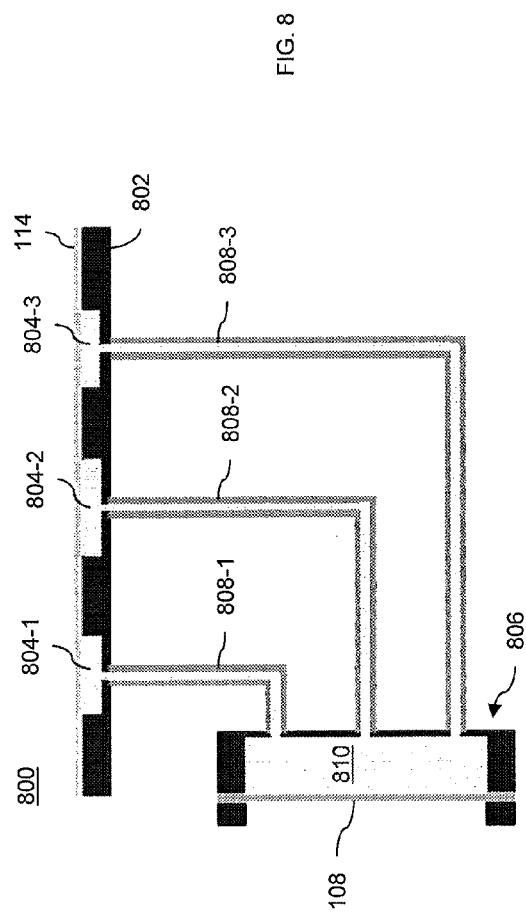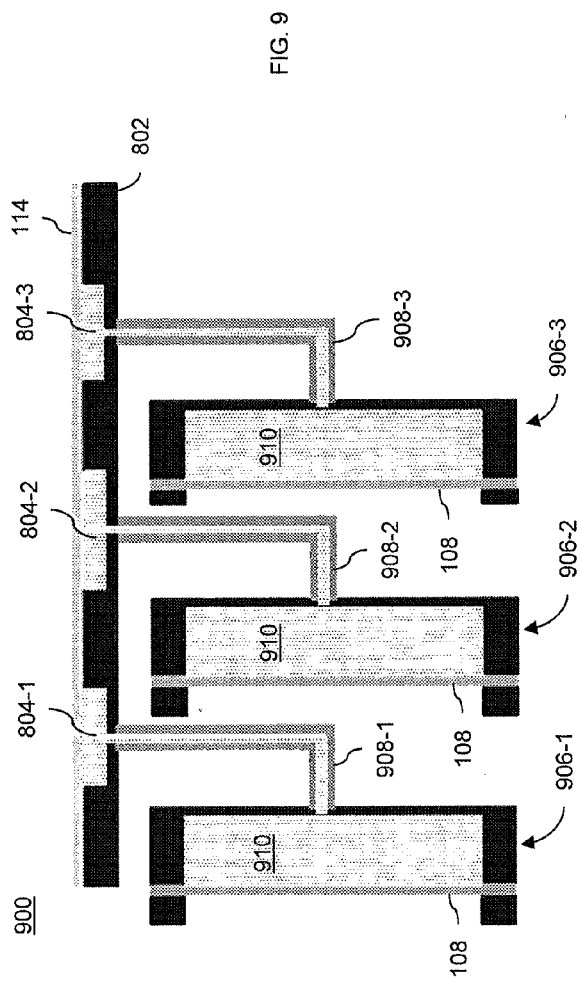

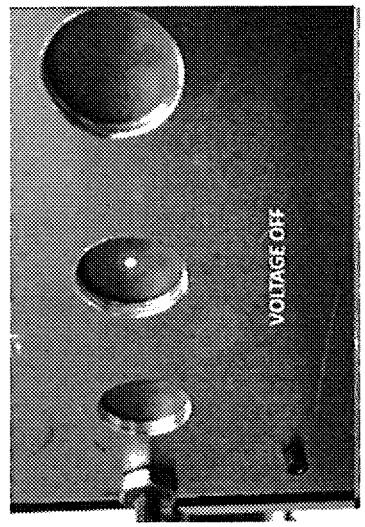 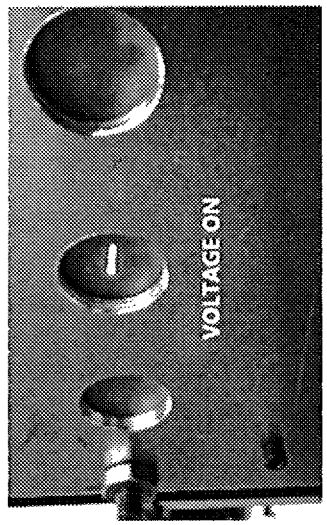
FIG. 14A
FIG. 14B

PIEZOELECTRIC DRIVEN OSCILLATING SURFACE

CROSS REFERENCE TO RELATED APPLICATIONS

This application is related to and claims the benefit of U.S. Provisional Application No. 61/761,756 entitled PIEZOELECTRIC DRIVEN OSCILLATING SURFACE filed on Feb. 7, 2013 and U.S. Provisional Application No. 61/733,460 entitled PIEZOELECTRIC DRIVEN OSCILLATING SURFACE filed on Dec. 5, 2012, the contents of each of which are incorporated herein by reference.

FIELD OF THE INVENTION

The present invention relates to the control of fluid through an active roughness actuator having a piezoelectric driven oscillating surface (PDOS).

BACKGROUND OF THE INVENTION

"Flow control" is the ability to control a fluid in a way that makes it behave differently than it would naturally. This is a field that has been steadily rising in aerodynamics and fluid dynamics. Flow control may be separated into two different techniques: passive techniques (i.e., always acting on the fluid) and active techniques (i.e., which may be turned on and off or proportionally). Passive techniques are the older of the two techniques. Examples of passive techniques include vortex generators to enhance mixing, roughness strips to induce turbulence and air redirection to transport momentum. Active techniques may be more effective than passive techniques; however, they require energy input and are generally less developed as a technology. Examples of active techniques include synthetic jets and steady blowing (to inject momentum to the flow), as well as dynamic (i.e., active) roughness (to control the flow's turbulence levels).

The benefits of active roughness may be significant. Often, a flow control technique is only desired during certain periods of time. For example, flow control may be desired during takeoff and landing of an aircraft, and may not be desired while the aircraft is cruising. In addition, dynamic control of the fluid may allow for inducing various amounts of control of multiple actuators in the same flow field. For example, there may be two dynamic roughness elements, one on each wing of an aircraft. If one element is turned on while the other element is turned off, a non-symmetric lift is generated and may cause a roll action to the aircraft. This creates the ability to control the aircraft without the use of ailerons.

Examples of current dynamic roughness technologies include compressed air driven dimples, mechanically driven pistons, and electro active polymers (EAPs). Compressed air dimples, for example, are roughness elements that deflect utilizing controlled compressed air. Although current dynamic roughness technologies can actively change the roughness, and can achieve high levels of roughness displacement, deficiencies do exist.

With compressed air, the frequency response is extremely low and cannot be used to excite the flow's natural frequencies. To excite a flow field, different characteristic frequencies may be used. These frequencies can be on the order of about 100 Hz (for example, for a flow of air over a surface). Anything below this frequency will decay and not affect the flow field, which is undesirable. Anything well above this frequency may create a steady effect in time to the flow field. At high enough frequencies (on the order of about 1 kHz), the steady effect may be used (in conjunction with pulse or amplitude modulation) to excite characteristic frequencies. Another drawback to current designs is that fluidic plumbing to the actuator is required. This is a significant limitation of the technology and may not be desirable for use in an aircraft.

Mechanically driven roughness elements are typically applied in two ways, either the piston displaces fluid (which displaces dimples) or the piston itself acts as a roughness element. This form of roughness can achieve high deflections in both cases. However, the mechanical aspects of the piston tends to be very complex. Mechanically driven roughness elements may include an elaborate design and may be difficult to apply to a large scale surface. The designs also tend to be heavy and may penalize an aircraft (by added fuel expenditure). Also, a mechanical system may be limited to maximum frequencies that can be obtained (due to its structural design), and may have difficulty reaching the frequencies required to excite the flow field.

Another active roughness element developed is the EAP applied to a dimple configuration. Generally, EAPs are two surfaces that, when excited with a high voltage, are attracted to each another. With a dimple configuration between the two attractive surfaces, the result is a deflected dimple flow field. Although EAP technology does not have complex plumbing and may reach the frequencies of actuation required for flow excitement, the EAP has limited deflection capabilities. For example, EAPs typically reach maximum displacements on the order of about 0.1 mm. Also, EAPs are limited to deflect downwards into the surface. EAP technology generates an attractive force, so that dimples may start flat, deflect downwards into the surface, and then return to the flat position through one actuation cycle. In terms of energy consumption, EAPs require very high voltages (on the order of about 1,000 V). Lastly, a top surface of an EAP is electrified, which may require further development to make EAPs resilient to weather conditions, such as humidity and rain (which may cause outright failure of the actuator). It may be appreciated that human safety is also a factor with an electrified surface.

SUMMARY OF THE INVENTION

According to one aspect of the invention, an active roughness actuator is provided. The active roughness actuator includes a surface having at least one aperture; a compliant layer disposed on the surface such that the compliant layer covers the at least one aperture; a chamber having a fluid therein and a piezoelectric surface mechanically coupled to the chamber. The chamber is in fluid communication with the compliant layer via the at least one aperture. The piezoelectric surface is configured to displace the fluid in the chamber to control production of at least one dimple in the compliant layer proximate to the at least one aperture.

According to another aspect of the invention, a method of forming an active roughness actuator is provided. The method includes forming at least one aperture in a surface; disposing a compliant layer on the surface such that the compliant layer covers the at least one aperture; forming a chamber having a fluid therein such that the chamber is in fluid communication with the compliant layer via the at least one aperture; and mechanically coupling a piezoelectric surface to the chamber. The piezoelectric surface is configured to displace the fluid in the chamber to control production of at least one dimple in the compliant layer proximate to the at least one aperture.

BRIEF DESCRIPTION OF THE DRAWINGS

FIGS. 1A, 1B, 1C and 1D are cross-section diagrams of an exemplary PDOS active roughness actuator, in various states of operation, according to an embodiment of the present invention;

FIGS. 2A, 2B and 2C are cross-section diagrams of a bound piezoelectric surface of the actuator shown in FIG. 1A, illustrating deflection of the piezoelectric surface as a function of input voltage, according to an embodiment of the present invention;

FIGS. 3A, 3B and 3C are cross-section diagrams of a bound piezoelectric surface of the actuator shown in FIG. 1A, illustrating example boundary conditions for the piezoelectric surface, according to embodiments of the present invention;

FIGS. 4A, 4B and 4C are cross-section diagrams of a bound piezoelectric surface of the actuator shown in FIG. 1A, illustrating examples of types of piezoelectric surfaces, according to embodiments of the present invention;

FIGS. 6A, 6B and 6C are cross-section diagrams of example PDOS actuators, illustrating a relationship between aperture diameter and displacement of fluid volume, according to an embodiment of the present invention;

FIG. 8 is a cross-section diagram of an exemplary PDOS actuator, according to another embodiment of the present invention;

FIG. 9 is a cross-section diagram of an exemplary PDOS actuator having multiple chambers, according to another embodiment of the present invention;

FIGS. 14A and 14B are example images of a portion of the PDOS actuator shown in FIG. 11, illustrating the actuator in un-actuated and actuated states, according to an embodiment of the invention.

DETAILED DESCRIPTION OF THE INVENTION

Figure 5A:
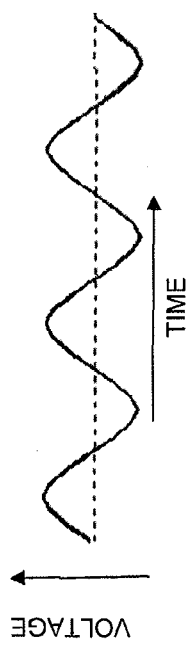
FIGS. 5A, 5B, 5C and 5D are graphs of voltage as a function of time illustrating various input voltage signals for the PDOS actuator shown in FIG. 1A, according to embodiments of the present invention.

Aspects of the invention relate to exemplary active roughness actuators and exemplary methods of forming active roughness actuators. The active roughness actuator may include a piezoelectric surface mechanically coupled to a chamber filled with a fluid. The chamber may be in fluid communication with at least one aperture of a surface. A compliant layer may be disposed on the surface, to cover the at least one aperture. In operation, displacement of the piezoelectric surface may displace the fluid in the chamber, which displaces the compliant layer proximate to the at least one aperture. Displacement of the compliant layer may cause at least one dimple in the compliant layer to be formed proximate the at least one aperture. Thus, the actuator may use the driving force of a bound piezoelectric surface to displace the fluid in the chamber, which in turn may displace the compliant layer. Exemplary active roughness actuators of the present invention are also referred to herein as piezoelectric driven oscillating surface (PDOS) actuators.

According to an exemplary embodiment, an exemplary PDOS actuator may allow a compliant layer with dimples to oscillate at a controlled frequency and amplitude. A driving force for the dimples includes a piezoelectric surface (such as a piezoelectric disk) connected to a controller that displaces a volume of fluid in a cavity of the chamber, which then translates through the cavity and allows dimple deflection. A single piezoelectric surface may drive all of the dimples of the surface so that they are in the same phase. According to another example embodiment, multiple piezoelectric surfaces may drive select dimples so that the phase, amplitude and frequency may be controlled independently.

Exemplary PDOS actuators may be advantageous in the field of fluid dynamics, including flow control, as active roughness elements. Exemplary PDOS actuators may be applied at any frequency (the flow has multiple natural frequencies that may be excited), and the level of roughness may be adjusted. The actuators may be applied to any surface, such that the compliant layer having the dimples conform with the surface and the remaining portion of the actuator being housed below the surface, away from any weather conditions. The input voltage to the piezoelectric surface may also be minimal. For example, piezoelectric disks use a peak voltage of about 200 V and a current of about 0.2 A.

Referring to FIGS. 1A-1D, cross-section diagrams of an exemplary PDOS active roughness actuator, designated generally as actuator 100, are shown. In particular, FIG. 1A illustrates various components of actuator 100; and FIGS. 1B-1D illustrate various states of operation of actuator 100.

Actuator 100 may include chamber 102, piezoelectric surface 108 and compliant layer 114. Chamber 102 may include surface 104 having at least one aperture 112 and side surfaces 106. Piezoelectric surface 108 may be mechanically coupled to side surfaces 106 of chamber 102. Surface 104, side surfaces 106 and piezoelectric surface 108 may define cavity 110 filled with a fluid. Cavity 110 may be configured to be in fluid communication with aperture(s) 112 of surface 104. Compliant layer 114 may be disposed on surface 104, to cover aperture(s) 112. Piezoelectric surface 108 may include a piezoelectric material and may be coupled to controller 116. Controller 116 may be configured to apply an excitation voltage to piezoelectric surface 108, to displace piezoelectric surface 108. The excitation voltage applied to piezoelectric surface 108 by controller 116 may be an alternating current (AC) signal or a direct current (DC) signal. It is understood that actuator 100 represents an example embodiment, and that there may be many different configurations of a PDOS actuator, depending on its specific application.

Referring to FIGS. 1B-1D, operation of actuator 100 is described. As shown in FIG. 1B, when piezoelectric surface 108 is displaced in direction A (via an excitation voltage from controller 116), fluid in cavity 110 is displaced. The displaced fluid is transferred from cavity 110 through aperture(s) 112, causing compliant layer 114 to be displaced in direction a. Displacement of compliant layer 114 causes dimples 118 to be formed, which project away from cavity 110, and which correspond to apertures 112.

As shown in FIG. 1C, when the excitation voltage is removed (or is equivalently 0 V), piezoelectric surface 108 is returned to its un-actuated state (i.e., no deflections), and the fluid in compliant layer 114 is returned to chamber 110. Thus, no dimples are formed in compliant layer 114, and compliant layer 114 may conform to the shape of surface 104.

As shown in FIG. 1D, when piezoelectric surface 108 is displaced in direction B (via an excitation voltage from controller 116), fluid in cavity 110 is again displaced. However, this time the fluid is displaced in direction B. The displaced fluid causes compliant layer 114 to be displaced in direction b, causing dimples 118' to be formed, which project toward cavity 110, and which correspond to apertures 112.

In FIGS. 1B-1D, the deflection directions of piezoelectric surface 108 and compliant layer 114 are illustrated as being collinear. It is understood that actuator 100 represents an exemplary embodiment. For other exemplary PDOS actuators, the deflection directions of piezoelectric surface 108 and compliant layer 114 may be different. For example, in PDOS actuator 800 (FIG. 8), the deflection directions of piezoelectric surface 108 and compliant layer 114 are orthogonal.

Referring generally to FIGS. 1A-1D, aperture(s) 112 may have any suitable shape and size. Aperture(s) 112 may be, for example, circular, square, rectangular, oval, or any other symmetrical or nonsymmetrical geometric shapes. It may be appreciated that the size and shape of aperture(s) 112 dictate that shape and amount of deflection of dimples 118, 118' of compliant layer 114.

Actuator 100 may be used for compact situations, for example, with relatively flat surfaces. The shape of surface 104 is not limited to a flat surface, and may be configured to conform with any surface for which flow control is desired. It is understood that a shape of surface 104 may provide the shape of compliant layer 114 when actuator 100 is in the un-actuated state (i.e., no deflections). This allows actuator 100 to be designed to conform with any surface with which it interacts. For example, FIGS. 7A and 7B illustrate two examples of actuator 100 used with pipe 702 (FIG. 7A) and airfoil 710.

Figure 7A:
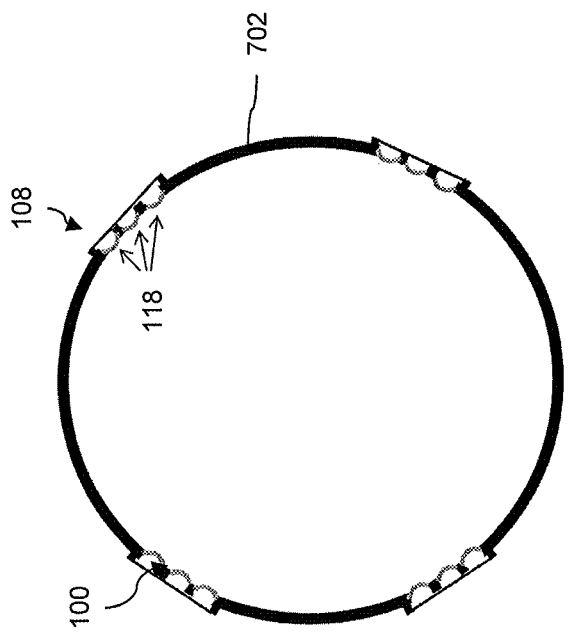
FIGS. 7A and 7B are cross-section diagrams of example structures including the PDOS actuator shown in FIG. 1A, according to embodiments of the present invention.

FIG. 7A is a cross-section diagram of pipe 702 having a plurality of actuators 100 with dimples 118 arranged inside pipe 702, and piezoelectric surface 108 on an outside surface of pipe 702. Dimples 118 (118' shown in FIG. 1D) may be used to control the fluid flow (such as oil flow) within pipe 702. When un-actuated, compliant layer 114 (FIG. 1A) may conform to a curvature of pipe 702.

Figure 7B:
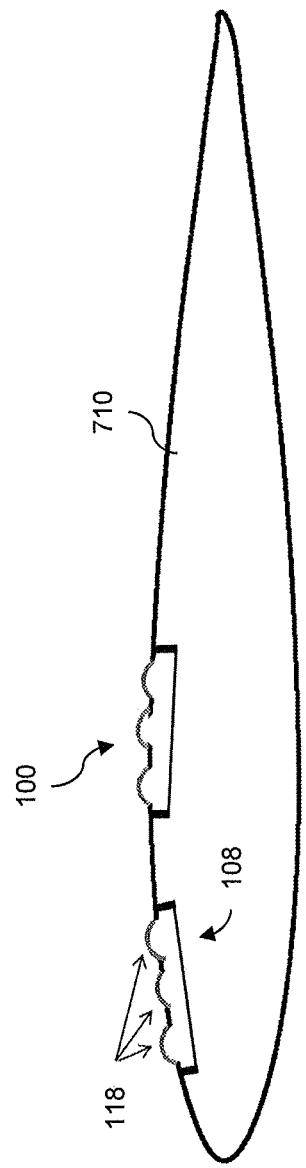

FIG. 7B is a cross-section diagram of airfoil 710 having two actuators 100 with dimples 118 arranged on an outside surface of airfoil 710, and piezoelectric surface 108 within airfoil 710. Dimples 118 (118' shown in FIG. 1D) may be used to control the air flow over airfoil 710. When un-actuated, compliant layer 114 (FIG. 1A) may conform to the outside surface of airfoil 710.

Referring back to FIGS. 1A-1D, compliant layer 114 may be formed from any elastomeric material that is compliant and may deflect to the shape of its boundaries. In an exemplary embodiment, compliant layer 114 may include, without being limited to, natural gum rubber (tensile strength of 3000 PSI), neoprene rubber (tensile strength of 1500 PSI) and natural latex rubber (tensile strength of 3850 PSI). In general, a compliant material may be defined as a material that is elastic and able transfer mechanical forces through its body. When an elastic material is deformed due to an external force, it experiences internal forces that oppose the deformation and restore it to its original state if the external force is no longer applied. As discussed further below, changing the compliant layer material may change the performance of actuator 100.

Actuator 100 illustrates an example PDOS actuator, where all dimples 118 (118') deflect in unison with deflection of piezoelectric surface 108. According to other embodiments, deflection of various dimples 118 (118') may be controlled independently, as described further below with respect to FIGS. 8-10. According to an exemplary embodiment, with an input (excitation) voltage on the order of about 100 V at high frequencies (on the order of about 1 kHz, but which may generally range from between about 100 Hz to about 100 kHz) to piezoelectric surface 108, PDOS actuator 100 may generate roughness elements (i.e., dimples 118) that actuate at peak displacements on the order of about 1 mm. As discussed further below, a variety of piezoelectric materials may be used for piezoelectric surface 108 of actuator 100, depending upon the application of actuator 100, and parameters piezoelectric surface 108 may be selected to obtain a desired actuator response.

A piezoelectric material of piezoelectric surface 108 may be selected such that if a voltage is applied across piezoelectric surface 108 while it is bounded, piezoelectric surface 108 may bend with the voltage signal (like a speaker). For example, FIGS. 2A-2C are cross-section diagrams of a piezoelectric surface 108 bound at boundary points 202 (e.g., at sides 106 of chamber 102), illustrating deflection of the piezoelectric surface 108 as a function of input voltage. In FIG. 2A, at time t=t0, the input voltage may be at a maximum negative value, which causes piezoelectric surface 108 maximum upward deflection. In FIG. 2B, at time t=t1, the input voltage may be at 0 V (i.e., an un-actuated state), which causes piezoelectric surface 108 to return to its unbent state. In FIG. 2C, at time t=t2, the input voltage may be at a maximum positive value, which causes piezoelectric surface 108 maximum downward deflection. Example piezoelectric materials are commonly used in smoke detectors to produce loud high pitched noises. These surfaces may reach significant surface deflections with practical voltage inputs.

In an exemplary embodiment, piezoelectric surface 108 may include a circular disk. It is understood that piezoelectric surface 108 is not limited to a circular shape, and may include any symmetric or nonsymmetrical geometric shape.

In general, the performance of piezoelectric surface 108 may be determined based on its peak deflection capability. The performance may be altered by changing one or more different properties of piezoelectric surface 108. It may be appreciated that properties of piezoelectric surface 108 may be selected to produce a desired performance of piezoelectric surface 108 (which may depend upon the application to which actuator 100 is used).

One property of piezoelectric surface 108 that may be adjusted is the way piezoelectric surface 108 is mechanically coupled to chamber 102 (FIG. 1A), known as the boundary condition. Generally piezoelectrics are coupled circularly, because this promotes an axisymmetric deflection. The coupled area of piezoelectric surface 108 may vary and the boundary condition may affect its performance. For example, FIGS. 3A-3C are cross-section diagrams of piezoelectric surface 108 illustrating various boundary conditions.

In FIG. 3A, boundary point 202 illustrates a pin condition. The pin condition represents a point of contact which ensures that at the point of coupling the deflection of piezoelectric surface 108 is zero. A pinned boundary condition defines the deflection at the boundary to be zero, but allows for there to be a non-zero slope of the material at the boundary. It has the benefit of increasing the deflection of piezoelectric surface 108, and reducing the concentration of stress near the boundary, but it may sacrifice the force of the piezoelectric surface output.

In FIG. 3B, boundary 302 illustrates a clamped condition. The clamped condition (also referred to herein as the wall bounded condition) represents a high area of contact which forces both the deflection and the slope of deflection piezoelectric surface 108 to be zero. This boundary condition has the benefit of increasing the force of piezoelectric surface 108, but it may sacrifice deflection with high stresses at the boundary.

In FIG. 3C, boundary 304 represents a compliant (represented with springs) condition. A compliant adhesive condition is one example of a compliant boundary condition which does not force the boundary deflection of piezoelectric surface 108 to be zero. Another example of a compliant boundary condition results from disposing a soft material (such as foam) between a clamped boundary (such as boundary 302 in FIG. 3B) and piezoelectric surface 108. The compliant boundary condition allows both the deflection and the slope of the deflection at the boundary to be non-zero. This may allow for very high deflections, but may reduce the force output of the disk.

The thickness of piezoelectric surface 108 may significantly affect the performance characteristics of actuator 100. The stiffness of actuator 100 may be a variable of piezoelectric thickness. For example, a thinner piezoelectric surface 108 may be able to reach higher deflections before cracking. (Piezoelectric materials, being ceramic, are brittle and prone to breaking if overly deflected.) A thinner piezoelectric surface 108, however, may have a reduced pushing force. A thicker piezoelectric surface 108 may have more pushing force, but may need a higher input voltage and may crack at lower deflections.

Other things may be done to optimize deflection of piezoelectric surface 108 without compromising force, such as coupling a piezoelectric material with another material. For example, FIGS. 4A-4C are cross-section diagrams of piezoelectric surface 108 formed of piezoelectric material layer 402 or a combination of piezoelectric material layer 402 and a further material layer 404, 406. Piezoelectric material layer 402 may be surrounded by a ring of metal material layer 404 (such as brass or other metal), as shown in FIG. 4B. Metal material layer 404 may absorb the higher stresses of deflection (which are seen near the boundary), allowing piezoelectric surface 108 to reach higher deflections. As another example, piezoelectric material layer 402 (or multiple piezoelectric layers (such as a bimorph)) may be sandwiched in or surrounded by plastic material layer 406. FIGS. 4A-4C represent example configurations of piezoelectric surface 108. It is understood that piezoelectric surface 108 is not limited to these configurations and that other combinations of materials may be used to form piezoelectric surface 108. It may be appreciated that optimization of the performance of piezoelectric surface 108 may allow for more fluid to be displaced in cavity 110 (FIG. 1A), which may result in improved performance of actuator 100.

Figure 5B:
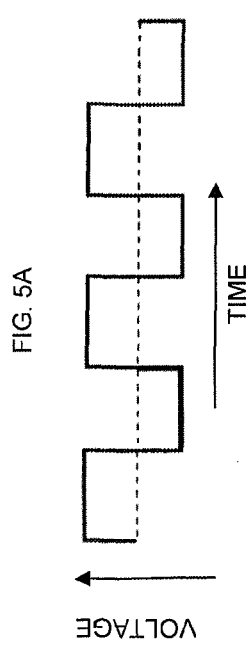
Figure 5C:
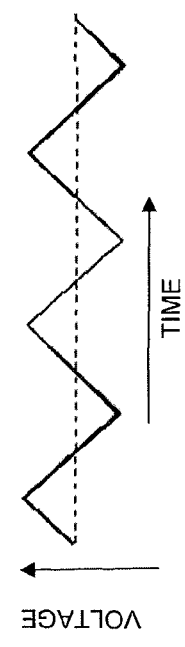
Figure 5D:
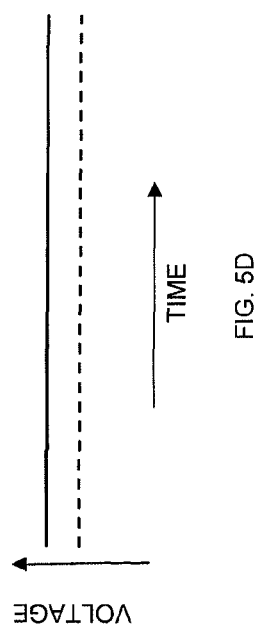

The performance of piezoelectric surface 108 may also depend upon the input voltage (from controller 116 shown in FIG. 1A). The input voltage may have many different shapes (e.g., sine waves, square waves, triangular waves, etc.) and may have a given input frequency and amplitude, as shown in FIGS. 5A-5C. In FIGS. 5A, 5B and 5C, graphs of voltage as a function of time are shown for input voltage signals of a sine wave, a square wave and a triangular wave, respectively. Generally, a sine wave shape (of the input voltage) may allow piezoelectric surface 108 to reach its peak deflection with the most gradual change in velocity (the slope of voltage with respect to time), which may cause the least amount of stress to piezoelectric surface 108. A larger voltage amplitude input to piezoelectric surface 108 may generally produce a larger deflection of piezoelectric surface 108. (Unless piezoelectric surface 108 has reached its maximum deflection before cracking, and then any increased voltage may not result in equal increase in displacement.) FIGS. 5A-5C illustrate AC waveforms. The input voltage may also include a DC waveform, an example of which is illustrated in FIG. 5D.

Frequency may also contribute to piezoelectric performance. Every material with a predetermined stiffness and a predetermined boundary condition has a natural frequency. For example, when a drum is beaten by a drumstick it makes a certain sound corresponding to a frequency, and that frequency is the surface's natural frequency. Piezoelectric surface 108 also has a natural frequency, with the voltage excitation acting as an input force. If the excitation frequency of the input voltage matches the piezoelectric frequency, the system is excited and the system performance may be improved. It may be appreciated that changing various properties of piezoelectric surface 108 (e.g., the boundary condition, the stiffness) may also change the natural frequency.

It may be appreciated that the range of frequencies and voltages input to piezoelectric surface 108 may be a broad range of values that depend upon the properties of piezoelectric surface 108. Different piezoelectric types, thicknesses, and boundary conditions may have different optimal input voltages and resonant frequencies.

In addition to the parameters of piezoelectric surface 108, properties of compliant layer 114 may affect the performance of actuator 100. A stiffer material may resist the forces of the outside flow field, but may also cause piezoelectric surface 108 to work harder to reach higher displacements. A weaker (i.e., less stiff) material may be easier to deflect while actuated, but may also be more easily disturbed by the surrounding flow field in the un-actuated state. Also, different materials may have different environmental resistance and fatigue properties. The compliant layer 114 may be in contact with the outside flow field. Thus, it is desirable that compliant layer 114 is designed to withstand environmental conditions. Also, the compliant layer 114 (e.g., an elastomeric material) may be actuated at high frequencies. Thus, it may be desirable that compliant layer 114 be resistant to high frequency fatigue. Different displacement shapes (of dimples 118 shown in FIG. 1B) may also have different effects on the fluid. The displacement shape may affect the actuator performance and may be dependent on the surrounding flow field.

The size of the area of aperture 112 that is open to compliant layer 114 may also have an effect on actuator 100, because piezoelectric surface 108 may displace a predetermined (i.e., fixed) volume of fluid. The displaced volume of fluid then displaces the total amount of compliant layer 114 exposed to the inside of the cavity (via aperture(s) 112) by the same displaced volume. This means that the larger the area exposed, the less the compliant layer will need to deflect to equal that displaced volume.

For example, FIGS. 6A-6C are cross-section diagrams of actuator 600 having a single aperture 112, illustrating the effect of different aperture diameters D1-D3 on displacement of fluid volume. In FIGS. 6A-6C, diameters D1-D3 of aperture 112 satisfy a relationship of D1<D2<D3, and piezoelectric surface 108 displaces predetermined volume 602. Volume 602, in turn, displaces volume 604 in dimple 618. As the diameter of aperture 112 increases from D1 to D2 to D3, volume 604 in dimple 618 is distributed over a larger area (from volume 604 to volume 604' to volume 604"). In turn, the displacement height is decreased from H1 (for dimple 618) to H2 (for dimple 618') to H3 (for dimple 618"), such that the dimple height satisfies a relationship of H1>H2>H3.

As discussed above, a bound material with a given stiffness has a natural frequency. In an exemplary embodiment, the natural frequencies of piezoelectric surface 108 and compliant layer 114 may be matched, to amplify the deflection of dimples 118.

Referring back to FIGS. 1A-1D, cavity 110 encloses the fluid that is displaced by piezoelectric surface 108. The fluid transmits the pressure generated from piezoelectric surface 108 to compliant layer 114. Different fluids may transmit the pressure differently. For example, more dense fluids (e.g., water) may transmit the pressure faster (the speed of sound in a fluid increases with density), but may provide more resistance to piezoelectric surface 108 (which may reduce the peak deflection amplitudes). Less dense fluids (e.g., air) may transmit pressure slower but may provide less resistance. As shown in FIGS. 1A-1D, the fluid remains in cavity 110 regardless of the activation state of actuator 100. The fluid in cavity 110 may include a liquid or a gas.

In general, a fluid may continually deform under an applied shear stress. By definition, a fluid is a material that forms to the container that it is placed in. The fluid may cover a broad range of substances, including without being limited to, for example, water (density of $1000$ $kg/m^3$), air (density of $1.225$ $kg/m^3$), and helium (density of $0.1785$ $kg/m^3$).

The amount of volume of the fluid in cavity 100 may affect the performance of actuator 100. If the volume is too high, the fluid may absorb all of the energy of the displacing piezoelectric surface 108 without transmitting it to compliant layer 114. This is much like sound travel. If one is too far away from a noise source then it may not be heard, because the sound has to travel too far and the air has absorbed the sound. It is also desirable that the volume of fluid in cavity 100 not be too small, because at least a predetermined volume of fluid is needed to allow the pressure to disperse and push evenly across cavity 110.

The amount of deflection of piezoelectric surface 108 may vary across its surface, for example, being bound at the edges and peaking in the center. This variation in deflection may generate a pressure in the fluid in cavity 110 that scales with the amount of deflection. Because this pressure may not be constant, the fluid works to disperse the pressure so that it is even across cavity 110. This allows each dimple 118 in compliant layer 114 to displace evenly.

The height of cavity 110 (i.e., the distance between surface 104 and piezoelectric surface 108) may not affect the ability actuator 100 to perform, but it may affect its performance capability. In some cases, increasing the cavity height may allow piezoelectric surface 108 to provide greater deflection, which in turn increases the performance of actuator 100. In other cases, increasing the cavity height may decrease the performance of actuator 100. For example, the distance between piezoelectric surface 108 and the surface 104 may be so large that the pressure wave dissipates too much before arriving at surface 104. The cavity height may be optimized in view of other given geometries (e.g., piezoelectric surface thickness, fluid type, type of compliant material, etc.).

Referring next to FIG. 8, a cross-section diagram of PDOS active roughness actuator 800 is shown, illustrating another exemplary embodiment of the present invention. Actuator 800 is similar to actuator 100 (FIG. 1A), except that chamber 806 (and piezoelectric surface 108) is separated from apertures 804 and compliant layer 114 via tubes 808.

Compliant layer 114 is disposed on surface 802 having apertures 804. Instead of apertures 804 being directly coupled to cavity 810 of chamber 806 (as in actuator 100 shown in FIG. 1A), apertures 804 are connected through tubes 808 to cavity 810. Each aperture 804-1, 804-2, 804-3 is coupled to (single) chamber 806 via respective tubes 808-1, 808-2, 808-3. As with actuator 100 (FIG. 1A), piezoelectric surface 108 is mechanically coupled to chamber 806, and chamber 806 includes cavity 810 having a fluid therein.

In operation, actuator 800 is similar to actuator 100 (FIG. 1A). Piezoelectric surface 108 may displace fluid in chamber 806, such that the displaced fluid distributes a pressure to compliant layer 114, to produce dimples 118 (118') (FIGS. 1B and 1D). A difference between actuator 100 and actuator 800 is that, with actuator 800, the displaced fluid is transported from cavity 810 to apertures 804 through tubes 808.

By having chamber 810 separated from surface 802 (and compliant layer 114), chamber 806 and piezoelectric surface 108 may be placed in a more convenient position for a desired application. For example, a surface that uses flow control may not be flat, and it may be beneficial to position chamber 806 and piezoelectric surface 108 in a different location.

According to an exemplary embodiment, a length of each tube 808 may be varied. For example, tubes 808-1 and 808-2 may have different lengths. As piezoelectric surface 808 displaces, it generates a pressure. The pressure travels through tubes 808 to reach apertures 804 and compliant layer 114. If the pressure source oscillates in time, and one tube (e.g., tube 808-2) is longer than another tube (e.g., tube 808-1), the pressure source may reach each aperture (e.g., apertures 804-1, 804-2) at different times. The delay in the pressure reaching apertures 804 may produce a phase lag between apertures 804 (thus generating a phase lag between dimples 118 (118') (FIGS. 1B and 1D)).

Referring to FIG. 9, a cross-section diagram of PDOS active roughness actuator 900 is shown, illustrating another exemplary embodiment of the present invention. Actuator 900 is similar to actuator 800 (FIG. 8), except that multiple chambers 906 coupled to corresponding piezoelectric surfaces 108 are used to provide individual control of apertures 804.

Each aperture 804-1, 804-2, 804-3 is coupled to respective chambers 906-1, 906-2, 906-3 via corresponding tubes 908-1, 908-2, 908-3. As with actuator 800 (FIG. 8), each piezoelectric surface 108 is mechanically coupled to corresponding chamber 906, and each chamber 906 includes cavity 910 having a fluid therein.

Because of the individual control provided to each aperture 804 by each piezoelectric surface 108 and chamber 906, each dimple 118 (118') (FIGS. 1B and 1D) may be produced with separate amplitude, frequency, and phase with respect to the other dimples. Thus, actuator 900 may allow for the ideal fluid control ability of the surrounding fluid. It may be appreciated that as number of dimples desired to be individually controlled increases, this may increase the number of chambers 906 and piezoelectric surfaces 108 that are needed. This, in turn, may increase the input power, and may reduce the efficiency of cost, space, and energy.

Although FIG. 9 illustrates a one-to-one relationship between chambers 906 (and piezoelectric surfaces 108) and apertures 804, a subset of apertures may be coupled to one chamber 906. For example, with a two-dimensional array of apertures (as shown in FIG. 12B), apertures 804 in each column of the array may be coupled to one chamber 906.

Although FIG. 9 illustrates tubes 908 having the same length, tubes 908 may also have different lengths, similar to the description above with respect to FIG. 8. Thus, tubes 908 of different lengths may also be used to control the phase between dimples.

Figure 10:
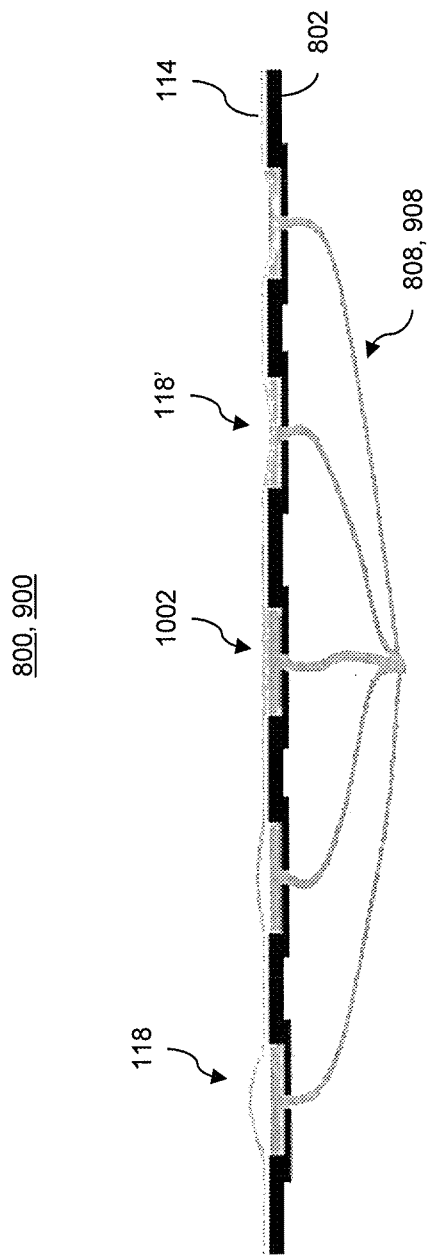
FIG. 10 is a partial cross-section diagram of an exemplary PDOS actuator illustrating independent control of various dimples, according to an embodiment of the present invention.

Referring to FIG. 10, a partial cross-section diagram of actuators 800, 900 are shown. FIG. 10 illustrates the individual control of dimples that may be produced by using different lengths of tubes 808 (FIG. 8) and/or by using multiple chambers 906 and multiple piezoelectric surfaces 108 (FIG. 9). For example, at one instance of time, actuator 800, 900 may produce dimples 118 (away from surface 802), dimples 118' (towards surface 802) and un-actuated regions 1002. As shown in FIG. 10, different dimples 118, 118' may also have different displacement amplitudes.

Referring back to FIG. 9, actuator 900 may provide several advantages. For example, a low power (e.g., on the order of 1 W) (electrical) controller 116 (FIG. 1A) may be used to supply a deflective force to actuator 900. Actuator 900 does not need fluidic plumbing or mechanical parts. Actuator 900 may achieve significant deflections (e.g., on the order of 1 mm amplitude) at high frequencies (e.g., on the order of 1 kHz). The shape of the deflection produced by actuator 900 may be controlled as desired by the user (e.g., dimples, deflection lines, etc.), because piezoelectric surface 108 provides the displacement force, and compliant layer 114 may deflect to form the dimple (e.g., dimples 118, 118' shown in FIG. 10) according to the shape of aperture 804 of surface 802. By using tubes 908 to transport the deflected volume, each dimple can be controlled independently. The material of compliant layer 114 may be adjusted, allowing actuator 900 to be used in any environmental condition. The area of excitation provided by surface 802 is not limited. Because of the small footprint of actuator 900, any number of dimples may be used on any shape of surface 802 as desired.

In general, the actuators described herein (e.g., actuators 100, 800, 900) may be used in a number of different applications. Example applications may include, without being limited to, fluid separation control in internal and external flow fields; boundary layer transition control in internal and external flow fields; mixing enhancement of a fluid, with applications in both aerodynamics and heat transfer; turbulence level control of a fluid, in internal and external flow fields; drag reduction, externally (e.g., an aerodynamic body in motion), or internally (e.g., oil pipe flows); aerodynamic and hydrodynamic vehicle stability and control (e.g., by replacing or augmenting existing control surfaces); acoustic noise control; high frequency mechanical switching; vortex generation due to dimple displacement; micro-valving; and vibration control.

EXAMPLE

Figure 11:
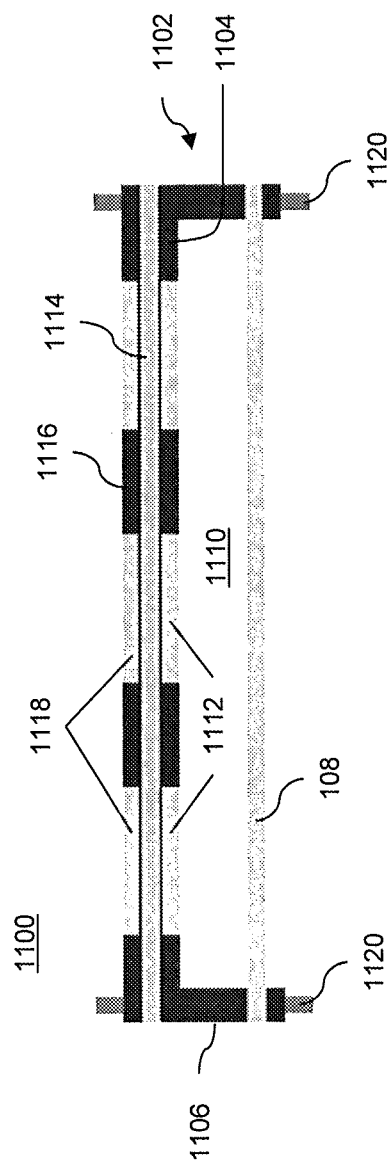
FIG. 11 is a cross-section diagram of an exemplary PDOS actuator, according to an embodiment of the invention.

A feasibility experiment was conducted based on actuator 100 shown in FIG. 1A. Referring to FIG. 11, a cross-section diagram of exemplary PDOS active roughness actuator 1100 is shown. Similarly to actuator 100 (FIG. 1A), actuator 1100 includes piezoelectric surface 108 mechanically coupled to chamber 1102, surface 1104 having first apertures 1112 and compliant layer 1114. Chamber 1102 includes surface 1104 and side surfaces 1106. Chamber 1102 includes cavity 1110 having a fluid therein. Actuator 1100, in addition, includes plate 1116 having second apertures 1118. Second apertures 1118 are desirably aligned with first apertures 1112. In actuator 1100, compliant layer 1114 is disposed (and clamped) between surface 1104 and plate 1116. Piezoelectric surface 108, compliant layer 1114 and plate 1116 are mechanically coupled to chamber 1102 via fastening screws 1120. Thus, like actuator 100 (FIG. 1), actuator 1100 is a compact design, with piezoelectric surface 108 directly driving compliant layer 1114 via first and second apertures 1112, 1114 to produce dimples (such as dimples 118, 118' shown in FIGS. 1B and 1D).

Figure 12A:
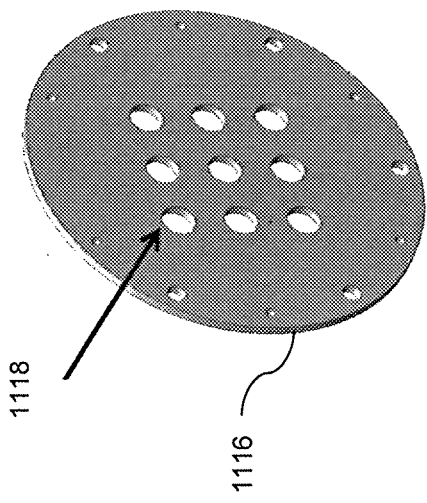
FIGS. 12A and 12B are perspective view diagrams of a perforated surface of the PDOS actuator shown in FIG. 11, illustrating various aperture configurations, according to an embodiment of the invention.
Figure 12B:
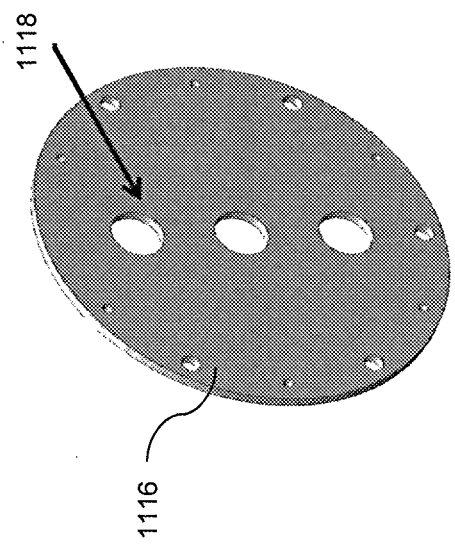

Referring to FIGS. 12A and 12B, perspective view diagrams of exemplary plates 1116 are shown which illustrate different arrangements/sizes of apertures 1118. For example, FIG. 12A illustrates a linear array of apertures 1118. In FIG. 12A, there are three apertures 1118 each having a 0.5" diameter. FIG. 12B illustrates a two-dimensional array of apertures 1118. In FIG. 12A, there are nine apertures 1118 each having a 0.3125" diameter. The different aperture configurations shown in FIGS. 12A and 12B were developed to show differences in displacement amplitude for different conditions.

As discussed above, in actuator 100, compliant layer 114 is adhesively coupled to surface 104 (FIG. 1A). In actuator 1100, compliant layer 1114 is clamped, by fastening plate 1116 on top of compliant layer 1114 using fastening screws 1120. Thus, compliant layer 1114 may held in place while still being allowed to deflect proximate to first and second apertures 1112, 1114. This configuration allowed for ease in changing between aperture 1118 configurations throughout the experiment.

A generic piezoelectric element was used in piezoelectric surface 108 for the experiment. In particular, a 0.5 mm thick piezoelectric disk (manufactured by Midé Technology Corp., part number FT020) was used which was circularly bound at 80 mm and had a resonance frequency of 700 Hz. Prior to the experiment, piezoelectric surface 108 was first characterized and calibrated. This is done by binding piezoelectric surface 108 without chamber 1102 attached (see FIGS. 2A-2C) and monitoring the center displacement (using a laser displacement sensor) of the surface 108 under multiple input voltages and frequencies.

Figure 13:
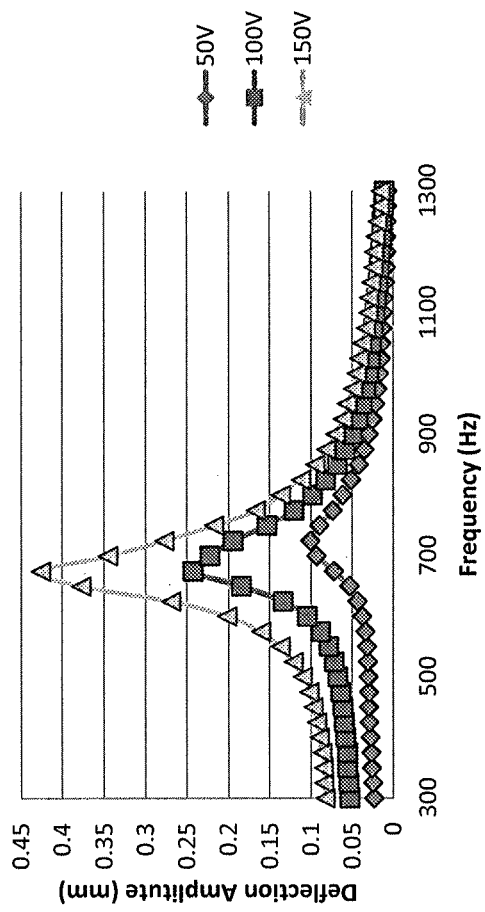
FIG. 13 is an example graph of deflection amplitude as a function of frequency for various input voltages, for the piezoelectric surface of the actuator shown in FIG. 11, according to an embodiment of the invention.

FIG. 13 is an example graph of resulting deflection amplitude as a function of frequency for input voltages of 50 V, 100 V, and 150 V. As shown in FIG. 13, the peak deflection of the piezoelectric surface 108 increases, with voltage input, reaching about 0.4 mm amplitude. This peak deflection occurs at the resonance frequency of piezoelectric surface 108, as described above, which is 675 Hz in this case.

Next, the results of the feasibility experiment are described. The rubber material chosen for compliant layer 1114 was a natural gum rubber having a quarter inch thickness. The rubber material was strong enough to withstand the compressive forces of the clamping while being compliant enough to achieve significant deflections. Actuator 1100 (FIG. 11) was assembled and the center deflection of central dimple was monitored using a laser displacement sensor accurate to about 0.5 µm. The maximum displacement for both aperture configurations (shown in FIGS. 12A and 12B) is: 1.4 mm at a frequency of 675 Hz for the three dimple configuration (shown in FIG. 12A); and 0.62 mm at a frequency of 675 Hz for the nine dimple configuration (shown in FIG. 12B).

Along with monitoring the deflection at the center of a dimple, a video of the deflection was also taken. FIGS. 14A and 14B are two screenshots of a portion of actuator 1100 (FIG. 11), one of the actuator off (FIG. 14A) and the other of the actuator on (FIG. 14B). A laser dot from the laser displacement sensor was reflected on the compliant layer at the center aperture. The sensor not only gave accurate nominal readings of the dimple deflection, but also the laser reflection provided visual confirmation of the dimple deflection.

Based on the experiment results, the actuator may be capable of reaching very high dimple displacements at high frequencies. The surface displacement may be a variable of the opening area, the compliant layer material, thickness, and tension, as well as the input voltage characteristics.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. An active roughness actuator comprising:
   a surface having plurality of apertures;
   a compliant layer disposed on the surface such that the compliant layer covers the plurality of apertures;
   a chamber having a fluid therein, the chamber being in fluid communication with the compliant layer via the apertures;
   a piezoelectric surface mechanically coupled to the chamber; and
   a plurality of dimples in the compliant layer, each dimple located proximate to one aperture of the plurality of apertures,
   wherein the piezoelectric surface is oscillated to displace the fluid in the chamber to control the at least one dimple to oscillate at a specified frequency to control the active roughness of the actuator, and
   wherein the chamber is fluidly coupled to the plurality of apertures via a corresponding plurality of tubes, and each of the plurality of tubes have a different length selected to control a phase lag between the plurality of apertures.

2. The active roughness actuator of claim 1, further comprising a controller electrically coupled to the piezoelectric surface, the controller configured to apply an excitation voltage signal to the piezoelectric surface to control displacement of the piezoelectric surface.

3. The active roughness actuator of claim 2, wherein the chamber is disposed between the piezoelectric surface and the surface having the apertures, and responsive to the excitation voltage signal:
   the piezoelectric surface is configured to be displaced in at least one of a first direction or a second direction opposite the first direction,
   displacement in the first direction produces at least one dimple of the plurality of dimples in a direction away from the chamber, and
   displacement in the second direction produces at least one dimple of the plurality of dimples in a further direction toward the chamber.

4. The active roughness actuator of claim 1, wherein the fluid includes a liquid or a gas.

5. The active roughness actuator of claim 1, wherein the compliant layer is formed from an elastomer material.

6. The active roughness actuator of claim 1, wherein the surface having the apertures is a surface of the chamber.

7. The active roughness actuator of claim 1, wherein the chamber includes a plurality of chambers corresponding to the plurality of apertures, the piezoelectric surface includes a plurality of piezoelectric surfaces coupled to the respective plurality of chambers, and the plurality of chambers are fluidly coupled to the plurality of apertures via the respective plurality of tubes.

8. An active roughness actuator system, the system comprising:
   an actuator including:
      a plurality of apertures,
      a compliant layer on the surface of the actuator such that the compliant layer covers the plurality of apertures,
      a chamber in the actuator having a fluid therein such that the chamber is in fluid communication with the compliant layer via the plurality of apertures,
      a piezoelectric surface mechanically coupled to the chamber,
      a plurality of dimples in the compliant layer, each dimple located proximate to one aperture of the plurality of apertures, and
      a plurality of tubes, each tube being fluidly coupled between the chamber and one of the plurality of apertures, and each of the plurality of tubes, having a different length selected to control a phase lag between the plurality of apertures; and
   a controller configured to:
      control the piezoelectric surface to oscillate to displace the fluid in the chamber to control the plurality of dimples to oscillate at a specified frequency to control the active roughness of the actuator.

9. The system of claim 8, wherein the compliant layer on the surface is at least one of mechanically clamped and adhesively coupled to the surface.

10. The system of claim 8, wherein the piezoelectric surface is mechanically coupled to the chamber by at least one of a pin, and a clamp.

11. The system of claim 8, wherein the piezoelectric surface includes at least one piezoelectric material layer on or within a non-piezoelectric material layer.

12. The system of claim 8, wherein the surface having the plurality of apertures is a surface of the chamber.

13. The system of claim 8, wherein the chamber includes a plurality of chambers, the piezoelectric surface includes a plurality of piezoelectric surfaces, the plurality of piezoelectric surfaces are mechanically coupled to the respective plurality of chambers, and
   wherein the plurality of tubes are mechanically coupled to the corresponding plurality of apertures and to the respective plurality of chambers.

14. The system of claim 8, wherein the controller is further configured to apply an excitation voltage signal to the piezoelectric surface to control displacement of the piezoelectric surface.

15. The system of claim 14, wherein the controller controls the active roughness actuator by controlling at least one of: a frequency of the excitation voltage signal, an excitation of the excitation voltage signal, and a shape of the excitation voltage signal.

* * * * *